United States Patent
Hornung et al.

(10) Patent No.: US 10,996,939 B2
(45) Date of Patent: May 4, 2021

(54) METHOD AND SYSTEM FOR REPLACING A SOFTWARE COMPONENT OF A RUNTIME SYSTEM

(71) Applicant: CODESYS Holding GmbH, Kempten (DE)

(72) Inventors: Armin Hornung, Wiggensbach (DE); Matthias Maier, Wolfertschwenden (DE); Adrian Scholl, Immenstadt im Allgaeu (DE); Bernhard Werner, Kempten (DE)

(73) Assignee: CODESYS Holding GmbH, Kempten (DE)

( * ) Notice: Subject to any disclaimer, the term of this patent is extended or adjusted under 35 U.S.C. 154(b) by 0 days.

(21) Appl. No.: 16/363,569

(22) Filed: Mar. 25, 2019

(65) Prior Publication Data

US 2019/0303131 A1 Oct. 3, 2019

(30) Foreign Application Priority Data

Mar. 27, 2018 (EP) ..................................... 18164107

(51) Int. Cl.
*G06F 9/44* (2018.01)
*G06F 9/445* (2018.01)
*G06F 8/65* (2018.01)
*G06F 8/70* (2018.01)
*G06F 8/656* (2018.01)

(52) U.S. Cl.
CPC ............ *G06F 8/65* (2013.01); *G06F 9/44521* (2013.01); *G06F 8/656* (2018.02); *G06F 8/70* (2013.01)

(58) Field of Classification Search
CPC ... G06F 8/65; G06F 8/656; G06F 8/70; G06F 9/44521
See application file for complete search history.

(56) References Cited

U.S. PATENT DOCUMENTS

| | | | |
|---|---|---|---|
| 6,199,203 B1 | 3/2001 | Saboff | |
| 9,021,512 B1* | 4/2015 | Gschwind | G06F 8/70 719/331 |
| 10,037,203 B1* | 7/2018 | Chavez | G06F 8/656 |

(Continued)

OTHER PUBLICATIONS

Feng Chen, Multi-version Execution for the Dynamic Updating of Cloud Applications, 2015, pp. 185-190. https://ieeexplore.ieee.org/stamp/stamp.jsp?tp=&arnumber=7273617 (Year: 2015).*

(Continued)

*Primary Examiner* — Mongbao Nguyen
(74) *Attorney, Agent, or Firm* — Steven J. Grossman; Grossman Tucker Perreault & Pfleger PLLC

(57) ABSTRACT

A method for replacing a software component among a plurality of software components of a runtime system, in particular a runtime system of an industrial control environment, comprises the steps of determining a first software component to be replaced among the plurality of software components, determining a second software component for replacing the first software component in the runtime system; initializing the second software component in the runtime system; routing a plurality of calls directed to the first software component centrally through a wrapper component; and switching the calls directed to the first software component to the second software component by means of a wrapper component.

11 Claims, 7 Drawing Sheets

(56) References Cited

U.S. PATENT DOCUMENTS

| | | | |
|---|---|---|---|
| 10,514,904 B2* | 12/2019 | Saraswati | G06F 8/656 |
| 2007/0250807 A1* | 10/2007 | George | G06F 8/656 |
| | | | 717/100 |
| 2011/0209131 A1* | 8/2011 | Hohenstein | G06F 8/316 |
| | | | 717/168 |
| 2014/0053274 A1* | 2/2014 | Stella | G06F 21/577 |
| | | | 726/25 |
| 2014/0337816 A1* | 11/2014 | Chiluvuri | G06F 8/36 |
| | | | 717/107 |
| 2014/0373171 A1* | 12/2014 | Grocutt | G06F 21/74 |
| | | | 726/27 |
| 2015/0193226 A1* | 7/2015 | Michelsen | G06F 8/70 |
| | | | 717/120 |
| 2016/0004630 A1* | 1/2016 | Masser | G06F 11/3672 |
| | | | 717/124 |
| 2016/0110236 A1* | 4/2016 | Mcclain | G06F 9/4484 |
| | | | 719/320 |
| 2016/0335076 A1* | 11/2016 | Thapar | G06F 8/65 |
| 2016/0357543 A1 | 12/2016 | Stanton et al. | |
| 2017/0097624 A1* | 4/2017 | Viste | G05B 19/0426 |
| 2018/0113695 A1* | 4/2018 | Gschwind | G06F 8/54 |
| 2018/0329698 A1* | 11/2018 | Jawa | G06F 21/54 |
| 2018/0329699 A1* | 11/2018 | Gschwind | G06F 8/4441 |
| 2020/0264853 A1* | 8/2020 | Neeman | G06F 8/434 |

OTHER PUBLICATIONS

Kristis Makris, Immediate Multi-Threaded Dynamic Software Updates Using Stack Reconstruction, 2008, pp. 1-14. http://citeseerx.ist.psu.edu/viewdoc/download;jsessionid=94C6347CE577DCAE17EBA5F279B864F3?doi=10.1.1.149.1026&rep=rep1&type=pdf (Year: 2008).*

European Search Report dated Jun. 4, 2018 in priority application No. EP18 164 107.7 (9 pgs).

* cited by examiner

METHOD AND SYSTEM FOR REPLACING A SOFTWARE COMPONENT OF A RUNTIME SYSTEM

FIELD OF THE INVENTION

The present disclosure relates to a field of industrial control, in particular to the control of industrial equipment by means of controllers that run a control application and are employed with a runtime system.

BACKGROUND

Industrial control environments are ubiquitous in many areas of industry and manufacturing, and may comprise a plurality of industrial controller units, wherein each of the controller units stores and runs a designated control software program adapted to control associated machinery or a group of machinery.

Modern industrial equipment and control environments provide numerous options or interfaces for communicating, via a network, with external components, such as for communicating with a programming environment and/or an industrial control network of machinery and equipment. For instance, it is desirable that industrial control environments provide a secure and authorized access to data of the industrial control.er unit, such as for local or remote maintenance applications, management and control.

The possibility of accessing a system via a network enhances the user comfort, but may pose security risks. In order to keep the security settings up to date, it may sometimes be required to update or replace parts of the software or firmware of the industrial controller unit, such as the software or firmware of a communication stack, user management or other security-relevant components of the firmware. Such firmware updates may also be required in case of malfunctions, or as part of a routine updating process.

It is desirable that any such updating interferes only minimally with the running industrial control process on the industrial controller unit, and should hence preferably be implemented "online", i.e., in real time during operation of the industrial controller unit and without interrupting the running industrial control process.

In terms of the update of the industrial controller unit, one should distinguish between its control application and its runtime system. The control application generally denotes software that controls the industrial process, whereas the runtime system may comprise software responsible for system tasks, such as task scheduling for the control application, communication with the external programming environment and industrial equipment, or connection to a database.

Typically, the control application can be updated or replaced without major difficulties even while the industrial control process is running. However, this is much more challenging for the runtime system.

Sometimes, this problem is addressed by means of redundant control systems. For instance, two or more identical controller units may be assigned to control the same process. One of the controller units is active, whereas another industrial controller unit may run the same control application in the background, but without engaging actively with the control process. If the primary controller unit fails, the redundant controller unit may take over, without significant delay. The redundant controller unit may also take over the control process while the primary controller unit is updated with new firmware or software, and vice-versa.

However, redundant controller units are expensive and increase the complexity of the industrial control environment.

What is needed is an improved and more efficient method and system for replacing the software component of a runtime system of an industrial control environment.

Overview of the Invention

This objective is addressed with a method and system for replacing a software component among a plurality of software components of a runtime system according to independent claims 1 and 11, respectively. The dependent claims relate to preferred embodiments.

In a first aspect, the disclosure relates to a method for replacing a software component among a plurality of software components of a runtime system, the method comprising: determining a first software component to be replaced among the plurality of software components; determining a second software component for replacing the first software component in the runtime system; initializing the second software component in the runtime system; routing a plurality of calls directed to the first software component centrally through a wrapper component; and switching the calls directed to the first software component to the second software component by means of the wrapper component.

By routing the plurality of calls directed to the first software component to be replaced centrally through the wrapper component, the calls to the first software component can be centrally monitored and controlled and can be centrally switched to the replacement second software component at an appropriate instant of time. The second software component can be initialized previously in the runtime system to prepare for the switching. The actual switching process can then be implemented in minimum time, and without interfering significantly with the running industrial control process. In particular, the method according to the present disclosure allows to update or replace software components of a component-based runtime system of an industrial controller unit in real time, without pausing or interrupting the running control application or the associated manufacturing equipment.

The techniques according to the present disclosure allow for a smooth and interference-free replacement of the first software component by the second software component even if several components or tasks may simultaneously place calls to the first software component.

Replacing a software component, in the sense of the present disclosure, may comprise any modification of the software component, including an update of the software component. Replacing may comprise fully replacing the software component, or partially replacing the software component.

A wrapper component, in the sense of the present disclosure, may be any component of an industrial control system that bundles calls from one component to another component of the industrial control system. The wrapper component may be a component of the runtime system.

In some instances, the wrapper component may be a software component. In other instances, the wrapper component may be a hardware component. In some examples, the wrapper component may be implemented partly in hardware and partly in software.

Software, in the sense of the present disclosure, should be understood to also include firmware.

According to an example, the runtime system is a runtime system of an industrial control environment, in particular of an industrial controller unit.

The runtime system may be adapted to implement at least one system task for a control application of an industrial control environment.

In particular, the runtime system may be adapted to implement a task scheduling for a control application of an industrial control environment, and/or may be adapted to implement a communication task for communicating with a remote device of an industrial control environment, and/or may be adapted to implement an access to an external database or memory.

In the context of the present disclosure, the first software component may be any software component of a runtime system of an industrial control environment.

Similarly, the second software component may be any software component suitable for replacing the first software component in the runtime system.

According to an embodiment, the first software component and/or the second software component may be adapted to implement a system task for a control application of an industrial control environment.

For example, the first software component and/or the second software component may be adapted to implement a task scheduling for a control application of an industrial control environment, and/or may be adapted to implement a communication task for communicating with a remote device of an industrial control environment, and/or may be adapted to implement an access to an external database or memory.

According to an embodiment, all the calls to the first software component may be routed centrally through the wrapper component.

In an example, the first software components to be replaced can be characterized as software components that can only be called through the wrapper component.

According to an example, the method of the disclosure can be implemented without interrupting an operation of the runtime system, and/or an operation of an industrial control application to which the runtime system pertains, and/or an industrial control process controlled by the control application and/or the runtime system.

In general, the method steps described in the context of the present disclosure do not need to be performed in the order in which they are recited in the claims, and can generally be performed in any order. In particular, the steps of determining a first software component to be replaced among the plurality of software components, determining a second software component for replacing the first software component in the runtime system, initializing the second software component in the runtime system, and/or routing a plurality of calls directed to the first software component centrally through a wrapper component may be performed in any order.

However, according to a preferred embodiment, the calls directed to the first software component are switched to the second software component after initializing the second software component. This allows for a switching in minimal time, and hence minimizes the interruption of the operation of the industrial controller unit and controlled machinery.

According to an embodiment, the calls directed to the first software component are switched to the second software component upon instruction.

The instruction may be a user-initiated instruction. In other instances, the instruction may be an automatic instruction given in response to a verification that a predetermined switching condition is fulfilled.

In an example, the method further comprises detecting a presence of active calls directed to the first software component, and switching to the second software component only if no active calls are detected.

According to an embodiment, the method further comprises blocking calls directed to the first software component, prior to switching the calls directed to the first software component to the second software component.

According to the embodiment, calls to the first software component may be blocked for the duration of the switching. This avoids malfunctions that could result if the first software component were called during the switching. As described above, the switching time can be minimized, and hence the interference of the blocking or switching with the running industrial control application may be negligible.

According to an example, the method comprises setting function pointers to the second software component in the wrapper component, prior to switching the calls directed to the first software component to the second software component.

In particular, switching the calls to the second software component may comprise switching function pointers to the first software component to function pointers to the second software component, in the wrapper component.

In some instances, switching the function pointers is the only switching operation required after initializing the second software component. This allows to minimize the switching time and hence the effect on the running control application.

In other examples, additional operations may be advisable or required as part of the switching. For instance, in some examples, switching the calls to the second software component may comprise changing a data layout of a call by means of the wrapper component.

The method may also comprise loading the second software component into the runtime system, prior to initializing the second software component in the runtime system.

In an example, the method further comprises removing or unloading the first software component from the runtime system, after switching the calls to the second software component.

According to this example, the first software component is fully replaced by the second software component, and only the second software component remains in the runtime system.

In some examples, the method further comprises removing function pointers to the first software component from the wrapper component, after switching the calls to the second software component.

In some examples, the wrapper component is a permanent or fixed component or constituent of an industrial control environment.

In other examples, the method further comprises loading the wrapper component, and re-routing or diverting the plurality of calls directed to the first software component centrally through the wrapper component.

The method may further comprise removing or unloading the wrapper component, after switching the calls directed to the first software component to the second software component.

In these instances, the wrapper component may only become active in connection with or for the duration of a replacement of a software component.

According to an embodiment, initializing the second software component may comprise setting at least one function pointer to other components in the second software component.

The at least one function pointer may correspond to function pointers pertaining to the first software component. In this way, embodiments may realize a switching of function pointers.

Alternatively, or additionally, initializing the second software component may comprise handing over at least one data pointer to active data pertaining to the first component.

In these instances, the second software component may be a replacement of the first software component, in that it shares the function pointers and/or data pointers of the first software component.

In some embodiments, initializing the second software component may comprise allocating or initializing additional data pertaining to the second software component.

The additional data may be allocated or initialized by means of the wrapper component, or by means of a memory management unit.

In a second aspect, the disclosure pertains to a computer program or to a computer program product comprising computer-readable instructions adapted to implement, when read on a computer system, a method with some or all of the features described above.

In a third aspect, the disclosure relates to a system for replacing a software component among a plurality of software components of a runtime system, the system comprising: a component manager unit adapted to determine a first software component among the plurality of software components, wherein the first software component is to be replaced; and further adapted to determine a second software component for replacing the first software component in the runtime system; an initialization unit adapted to initialize the second software component in the runtime system; and a wrapper component adapted to route a plurality of calls directed to the first software component centrally through the wrapper component; wherein the wrapper component is adapted to switch the calls directed to the first software component to the second software component.

The system may be adapted to implement a method with some or all of the features described above with reference to the first aspect.

The system may be the runtime system or may form part of the runtime system.

The component manager unit and/or the initialization unit and/or the wrapper component may be implemented in software or in hardware, or in a combination of software and hardware.

In some examples, the component manager unit and/or the initialization unit and/or the wrapper component may be separate units. In other examples, some or all of the units/components may be combined into a common unit.

According to an embodiment, the system further comprises a monitoring unit adapted to detect a presence of active calls directed to the first software component.

The wrapper component may be communicatively connected to the monitoring unit and may be adapted to switch to the second software component only if no active calls are detected by the monitoring unit.

In an example, the monitoring unit is communicatively connected to, or part of a scheduler unit of the runtime system.

According to an embodiment, the wrapper component may be adapted to block calls to the first software component, prior to switching the calls directed to the first software component to the second software component.

In an example, the wrapper component may be adapted to set function pointers to the second software component in the wrapper component, prior to switching the calls directed to the first software component to the second software component.

According to an embodiment, the wrapper component may be adapted to switch function pointers to the first software component to function pointers to the second software component, in the wrapper component.

In some instances, the wrapper component may be adapted to change a data layout of a call to the first software component and/or to the second software component.

According to an embodiment, the component manager unit may be adapted to load the second software component into the runtime system.

In some instances, the component manager unit may be adapted to remove or unload the first software component from the runtime system, after switching the calls to the second software component.

According to an embodiment, the component manager unit is adapted to load the wrapper component, and to re-route the plurality of calls directed to the first software component centrally through the wrapper component.

Further, the component manager unit may be adapted to remove or unload the wrapper component, after switching the calls directed to the first software component to the second software component.

According to an embodiment, the initialization unit may be adapted to set at least one function pointer to other components, and/or may be adapted to hand over at least one data pointer to active data pertaining to the first component.

According to an embodiment, the system may be adapted to allocate or initialize additional data pertaining to the second software component.

BRIEF DESCRIPTION OF THE FIGURES

The features and numerous advantages of the method and system for replacing a software component of a runtime system will be best apparent from a detailed description of embodiments with reference to the accompanying drawings, in which.

DESCRIPTION OF EMBODIMENTS

The invention will now be described in the context of a replacement of a software component of a runtime system of an industrial controller unit. However, the techniques of the present invention are not so limited and may be employed more generally for updating a runtime system.

Figure 1:
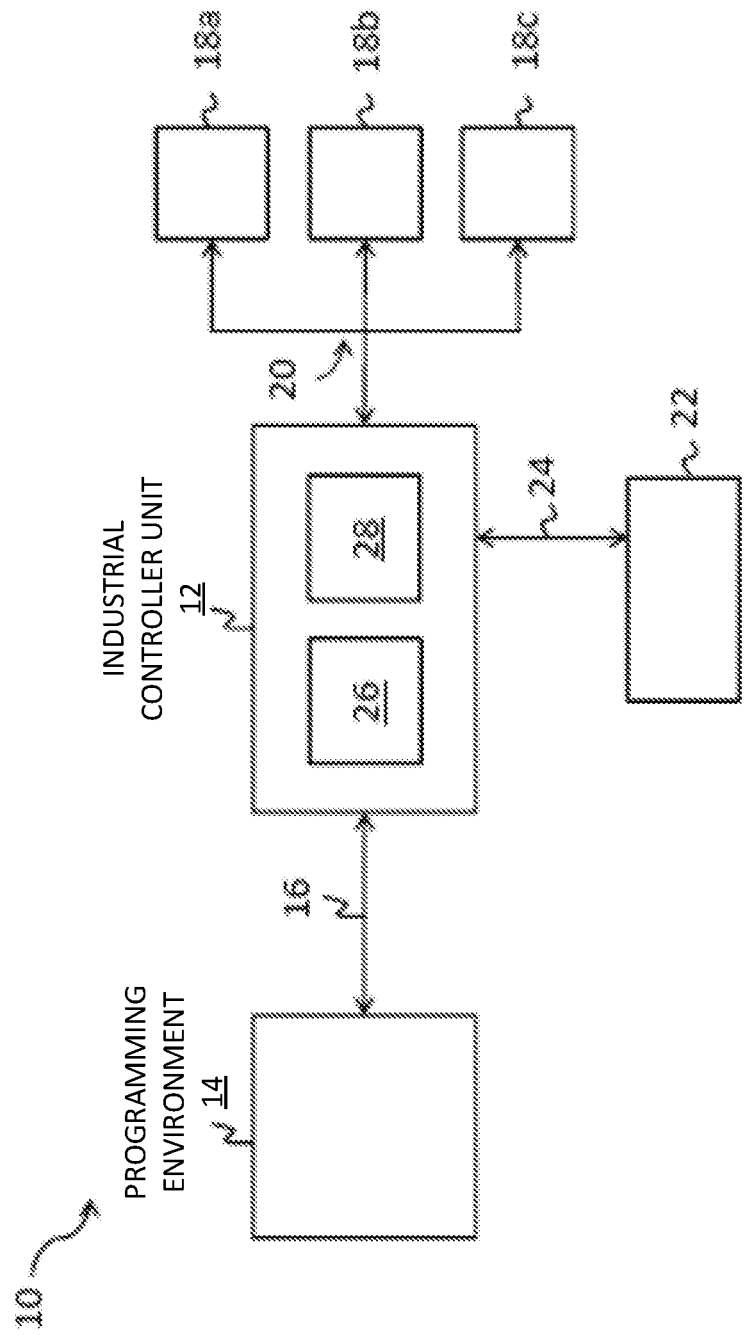
FIG. 1 is a schematic overview of an industrial control environment in which the method and system according to the present invention may be employed.

FIG. 1 is a schematic illustration of an industrial control environment 10 in which the techniques of the present disclosure may be employed. The industrial control environment 10 comprises an industrial controller unit 12 that is communicatively coupled to a programming environment 14 via a first network 16, and to a plurality of industrial control processes or machinery 18a, 18b, 18c via a second network 20.

The programming environment 14 may be a computer desktop environment and may be employed by a user to generate source code for an industrial control program for controlling the industrial control processes 18a, 18b, 18c. The programming environment 14 may compile the industrial control program and may provide the compiled industrial control program to the industrial controller unit 12 via the first network 16, such as via the internet.

In some examples, the programming environment 14 may also be employed to request and monitor operational parameters pertaining to an operation of the industrial controller unit 12 and/or the industrial control processes 18a, 18b, 18c from the industrial controller unit 12 via the first network.

The industrial controller unit 12 may comprise a processing unit (not shown) for running the compiled industrial control program and thereby exchanging instructions and/or data with the industrial control processes 18a, 18b, 18c via the second network 20, such as via a field bus system. For instance, the industrial controller unit 12 may provide instructions to each of the industrial machinery 18a, 18b, 18c in accordance with the industrial control program and may receive data from each of the machinery 18a, 18b, 18c pertaining to an operation of these devices.

As can be further taken from FIG. 1, the industrial control environment 10 further comprises an external database 22 that is communicatively coupled to the industrial controller unit 12 via a third network 24. In some examples, the third network 24 may be identical to the first network 16 or the second network 20.

The external database 22 may store industrial control programs and/or parameters that the industrial controller unit 12 may require for running an industrial control program.

FIG. 1 is merely a schematic illustration, and for simplicity shows a single industrial controller unit 12. In many applications, an industrial control environment may comprise a large number of industrial controller units, wherein each of the industrial controller units may control one or a plurality of industrial control processes.

As can be further taken from FIG. 1, the industrial controller unit 12 comprises a control application 26 as well as a runtime system 28. The control application 26 may comprise the software for controlling the industrial control process 18a, 18b, 18c, such as the compiled industrial control program received from the programming environment 14. In contrast, the runtime system 28 may support the control application 26 with system tasks, such as task scheduling for the control application 26, communication of the industrial controller unit 12 with the programming environment 14 and the industrial control processes 18a, 18b, 18c, as well as connection to the external database 22.

Components of the control application 26 may be relatively easy to replace, even while the industrial controller unit 12 is running and without interruption of the industrial control processes on the machinery 18a, 18b, 18c. However, this is more challenging for components of the runtime system 28.

Figure 2:
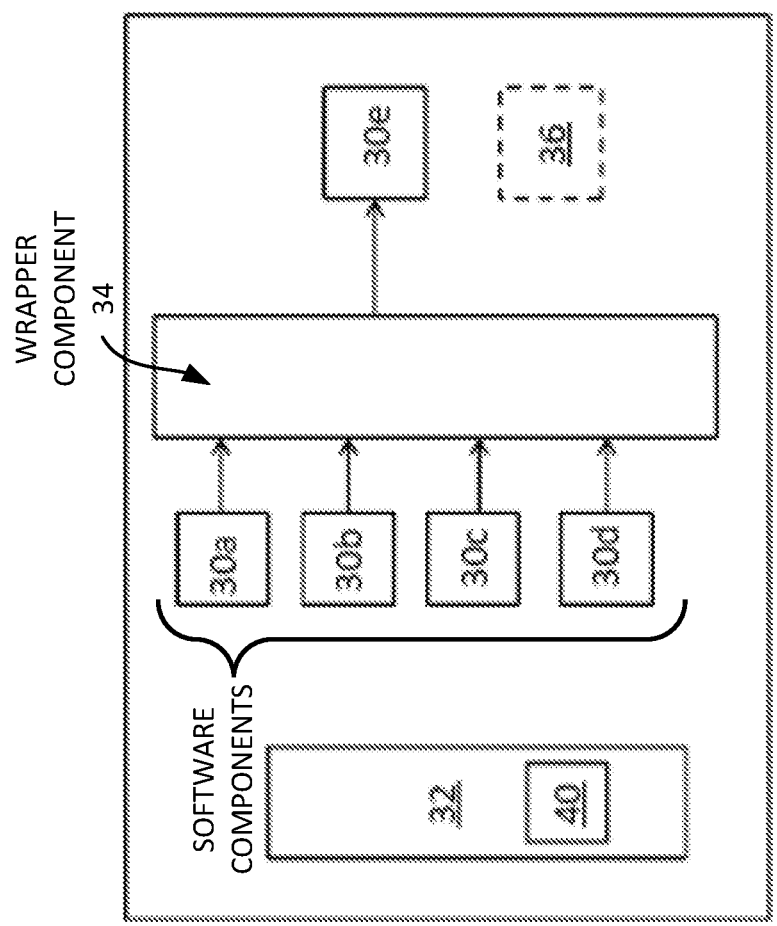
FIG. 2 is a schematic illustration of a runtime system of an industrial controller unit in which the method and system for replacing a software component according to an embodiment may be employed.

As schematically illustrated in FIG. 2, the runtime system 28 may comprise a plurality of software components 30a to 30e, wherein each of the software components 30a to 30e may be dedicated to one or plurality of specific tasks. For instance, the software component 30a may be responsible for the task scheduling of the control application 26, whereas the software component 30e may be responsible for communication with the programming environment 14 via the first network 16.

In the runtime system 28, each of the software components 30a to 30e may reference any other software component 30a to 30e, such as to call functions pertaining to another component 30a to 30e. The function calls of the software components 30a to 30d to the software component 30e are schematically illustrated by arrows in FIG. 2. This is just one example, wherein it is understood that any of the components 30a to 30e may similarly reference any other component 30a to 30e.

In the context of the present disclosure, the control application 26 may also be considered a component in this sense and can reference other components, such as the software components 30a to 30e, but may not be able to be referenced.

Each of the software components 30a to 30e may be provided with allocated memory (not shown), which holds the data pertaining to the respective components 30a to 30e.

Some of the software components pertaining to communication tasks, such as the software component 30e, may be critical for the security of the industrial controller unit 12 and the entire industrial control environment 10. Hence, these software components 30e may require a software or firmware update at regular instances, such as with security patches or up-to-date firewall or antivirus functionalities.

Moreover, any of the software components 30a to 30e may need to be replaced or updated in case of malfunctions, or as part of routine maintenance operations.

As illustrated in FIG. 2, the runtime system 28 comprises a component manager unit 32 which may be adapted for managing the software components 30a to 30e of the runtime system 28. For instance, the component manager unit 32 may control the loading, unloading or replacement of any of the software components 30a to 30e.

As can be further taken from FIG. 2, the runtime system 28 comprises a wrapper component 34 through which some or all of the calls from one software component 30a to 30d to another software component 30e may be routed. Not all of the calls of any one software component 30a to 30e to another software component 30a to 30e may necessarily always be routed through the wrapper component 34. However, the runtime system 28 and its component manager unit 32 may allow to re-route such calls through the wrapper component 34. In particular, software components that can be updated or replaced, such as the software component 30e, may be configured such that all the calls to this component can be routed or re-routed through the wrapper component 34.

In some examples, the wrapper component 34 is permanently activated in the runtime system 28. In other examples, the component manager 32 may be adapted to load the wrapper component 34 into the runtime system 28 and to reroute some or all of the calls through the wrapper component 34. The component manager 32 may also be adapted to un-load the wrapper component 34 from the runtime system 28, and to re-route the calls so that all the software components 30a to 30e call each other directly, rather than through the wrapper component 34.

Reference will now be made to the process of replacing the software component 30e by a replacement component 36, for instance as part of a security update. In a schematic illustration of FIG. 2, the replacement component 36 is indicated by dashed lines.

The component manager unit 32 may determine the software component 30e to be replaced, and the replacement component 36 based on an instruction received from a user of the industrial control environment 10. In other examples, the component manager unit 32 may determine the software component 30e to be replaced and the replacement component 36 automatically in accordance with a predetermined replacement schedule, such as a maintenance schedule.

The runtime system 28 may comprise an initialization unit 40 adapted to initialize the replacement component 36 in the runtime system 28. As illustrated in FIG. 2, in some examples the initialization unit 40 may form part of the component manager 32 of the runtime system 28. In other examples, the initialization unit 40 may be a stand-alone unit. In still other examples, the initialization unit 40 is part of the wrapper component 34.

The wrapper component 34 may comprise wrapper functions for all functions of the software component 30e to be replaced that can be called by any of the other components 30a to 30e. On the one hand, the wrapper function may re-route calls to the designated target software component 30e. On the other hand, the wrapper function may be adapted to detect whether a call to a function in the software component 30e to be replaced is currently active, before implementing a switch-over to the replacement component 36.

An exemplary sequence of steps associated with the replacement of the software component 30e by the software component 36 will now be described in greater detail with reference to FIGS. 3a to 3d.

Figure 3A:
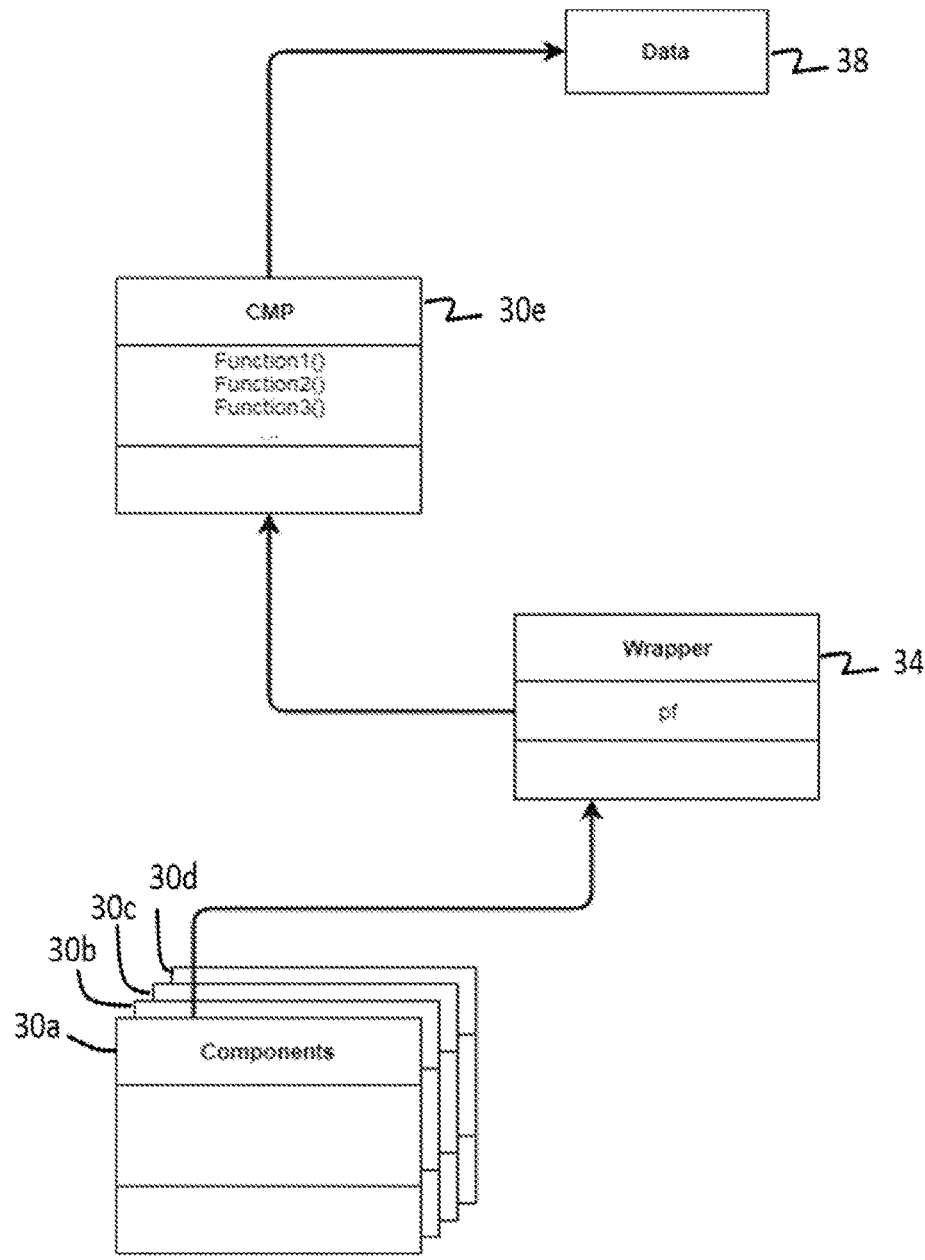
FIGS. 3a to 3d are schematic diagrams that illustrate consecutive steps of a method for replacing a software component according to an embodiment.

FIG. 3a illustrates an initial configuration, in which the software components 30a to 30d access the software component 30e through the wrapper component 34, as described above with reference to FIG. 2. The software component 30e may comprise a plurality of functions Function 1, Function 2, Function 3, ..., which may be accessed or called by the software components 30a to 30d via function pointers pf implemented in the wrapper component 34.

As further illustrated in FIG. 3a, data 38 may pertain to the software component 30e, and may be stored in an allocated memory area.

Figure 3B:
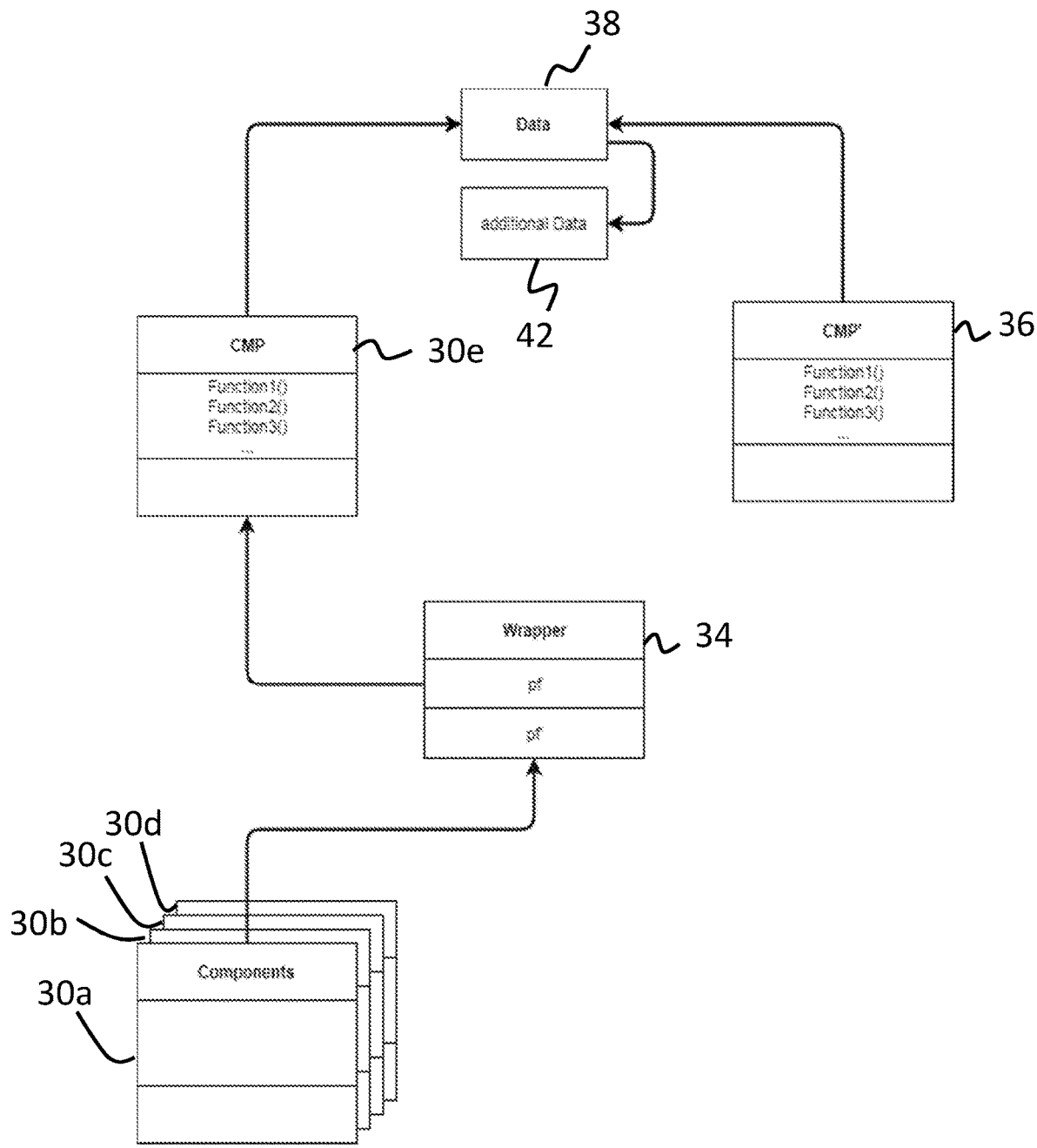

As illustrated in FIG. 3b, the replacement process may start with an initialization of the replacement component 36 in the runtime system 28.

Initialization of the replacement component 36 may comprise a loading of the replacement component 36 into the runtime system 28. Moreover, initialization may comprise providing the replacement component 36 with the required functions Function 1, Function 2, Function 3 and function pointers to other software components 30a to 30d, as may be required for operation of the replacement component 36. Given that the replacement component 36 is intended to serve as a replacement for the software component 30e and the runtime system 28, its functions and/or function pointers may be partly or fully identical to the functions and function pointers of the software component 30e.

Initialization may also comprise handing over a pointer to the current data 38 pertaining to the software component 30e.

In some examples, initialization of the replacement component 36 may also comprise initializing additional data 42 pertaining to the replacement component 36, as schematically illustrated in FIG. 3b. In some instances, the replacement component 36 may request and initialize the additional data 42. In other examples, allocating the memory pertaining to the additional data 42 may involve the component manager unit 32, the initialization unit 40 or a memory management unit (not shown).

As can be further taken from FIG. 3b, the initialization unit 40 further sets function pointers pf' to the functions of the replacement component 36 in the wrapper component 34. However, as of yet, the function pointers pf' are not active, and the wrapper component 34 still routes all function calls via the function pointers pf to the software component 30e.

Figure 3C:
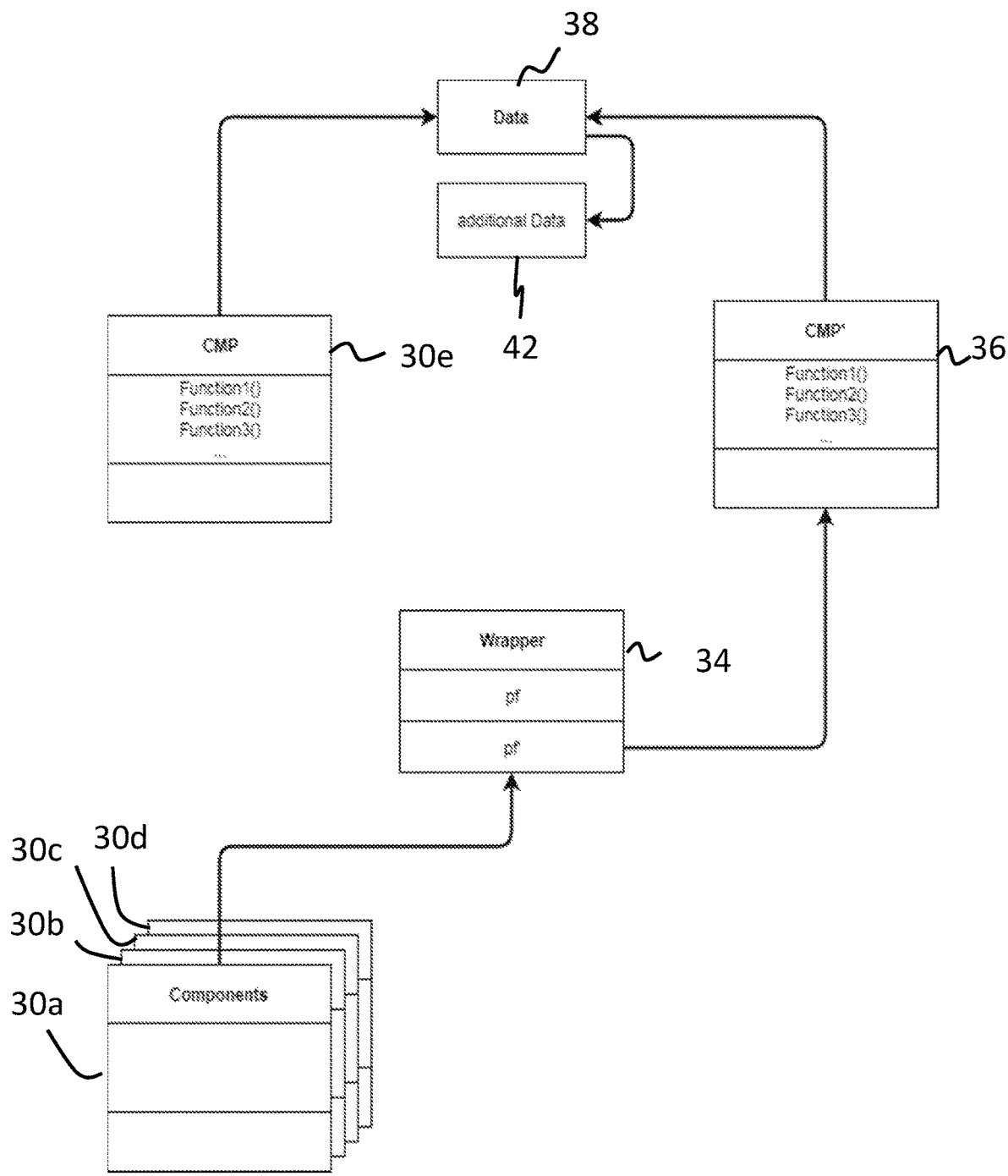

Once the initialization of the replacement component 36 is complete, the component manager unit 32 may switch the function pointers in the wrapper component 34 from pf to pf', i.e. from the software component 30e to the replacement component 36. The resulting configuration is schematically illustrated in FIG. 3c. The replacement component 36 is now active, and the software component 30e has become inactive.

Switching the function pointers in the wrapper component 34 can be done almost instantaneously, and without interfering with the operation of the runtime system 38, industrial controller unit 12 and the machinery 18a, 18b, 18c it controls.

In some examples, a monitoring unit such as the component manager unit 32 may monitor active calls to the software component 30e through the wrapper component 34 and may trigger the switching of the pointer functions pf to pf' only if there are no active calls detected.

In other examples, any active call to a software component 30e may be associated with a hardware lock in the wrapper component 34 that blocks a switching. The component manager unit 32 may then cyclically trigger a switching of the pointer functions pf to pf' in the wrapper component 34, which is blocked in the presence of active calls to the software component 30e but is implemented as soon as there is no active call. In other words, the pointer functions in the wrapper component 34 are switched in case a blanking interval without active calls is detected.

Figure 3D:
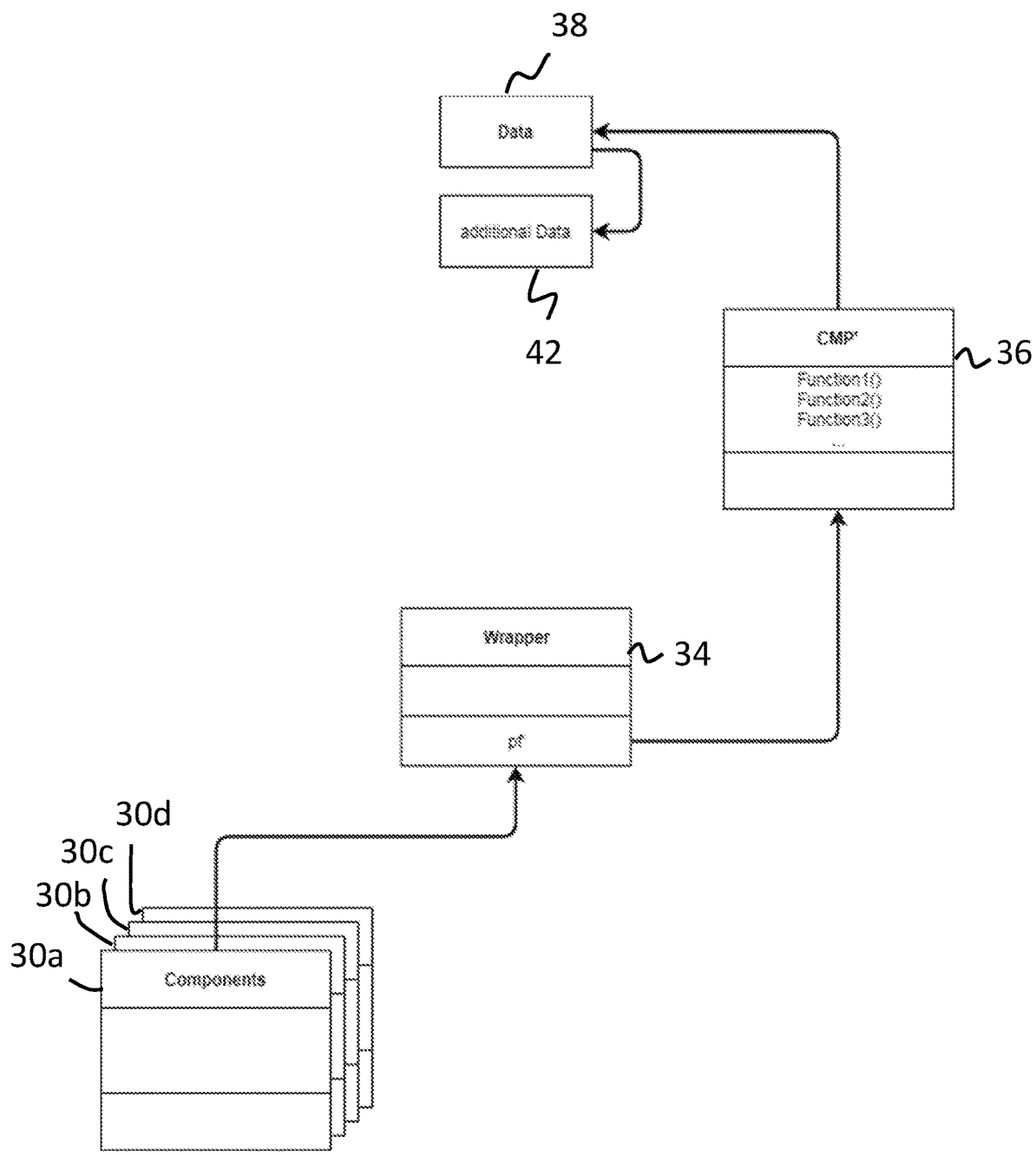

Once the wrapper component 34 has successfully switched the calls from the software component 30e to the replacement component 36, the component manager unit 34 may unload the software component 30e from the runtime system 28. The function pointers, pertaining to the software component 30e may likewise be removed from the wrapper component 34. The resulting configuration is schematically illustrated in FIG. 3d. The replacement is complete.

As a specific example, replacing the software component 30e may involve the substitution of a defect function code with a corrected function code for a given function. The replacement component 36 has the corrected function code, but may otherwise be identical to the software component 30e.

In pseudo code, the function code

```
// ---- Old Component code ----
int Cmp.FunctionAdd(int Param1, int Param2)
{
    // defect function code
    return Param1 - Param2;
}
``` may be replaced by a corrected function
//- - - - New Component code - - - -
int Cmp'.FunctionAdd(int Param1, int Param2)
{
  //corrected function code
  return Param1+Param2;
}
A corresponding wrapper function for the wrapper component 34 may be implemented as follows:
//- - - - Wrapper code - - - -
static int s_WrapperRefCount;
static int s_UsedComponent;

```
static PFUNC s_pComponentFunction[2];
//Initialize wrapper—called during startup by component
manger void InitWrapper( )
{
  s_WrapperRefCount=0;
  s_UsedComponent=0;
  s_pComponentFunction[0]=Cmp.FunctionAdd;
  s_pComponentFunction[1]=NULL;
}
//Get the function pointer of the new component and so
prepare the switchover.
Is not time critical.
void PrepareSwitchOver( )
{
  if (s_UsedComponent==0)
  {
    s_pComponentFunction[1]=Cmp'.FunctionAdd;
  }
  else
  {
    s_pComponentFunction[0]=Cmp'.FunctionAdd;
  }
}
```

```
// To switch over call TrySwitchOver( ) until it returns TRUE
bool TrySwitchOver(void)
{
      bool SwitchOverDone = FALSE;
        PrepareSwitchOver( );
      EnterLock( );
      if (s_WrapperRefCount == 0 && CheckSwitchOverAllowed( ) /* No other compo-
nent denies switch over */ )
      {
            if (s_UsedComponent == 0)
            {
                  s_UsedComponent = 1;
            }
            else
            {
                  s_UsedComponent = 0;
            }
            SwitchOverDone = TRUE;
      }
      LeaveLock( );
      return SwitchOverDone;
}
// Wrapperfunction, has to be called instead of using FunctionAdd( ) directly
void CDECL CDECL_EXT wrapperfunction_FunctionAdd(wrapperparam* p)
{
      EnterLock( );
      s_WrapperRefCount++;
      LeaveLock( );
      if (s_pComponentFunction[s_UsedComponent] == NULL)
      {
            assert( );
      }
      s_pComponentFunction[s_UsedComponent](p);
      EnterLock( );
      s_WrapperRefCount--;
      LeaveLock( );
}
```

This wrapper function can be called from different tasks simultaneously. It employs a counter to detect whether one of the functions of the software component 30e to be replaced is currently being called. The Enter Lock only allows the switching of the function pointers if there is no active call.

The wrapper component sketched above can be easily extended to wrap a plurality of functions, and hence can be adapted to employ an arbitrary number of online changes. The wrapper component 34 may not comprise any specific code for the function being called, and hence the code for the wrapper component can be adapted easily to any software component 30a to 30e.

Figure 4:
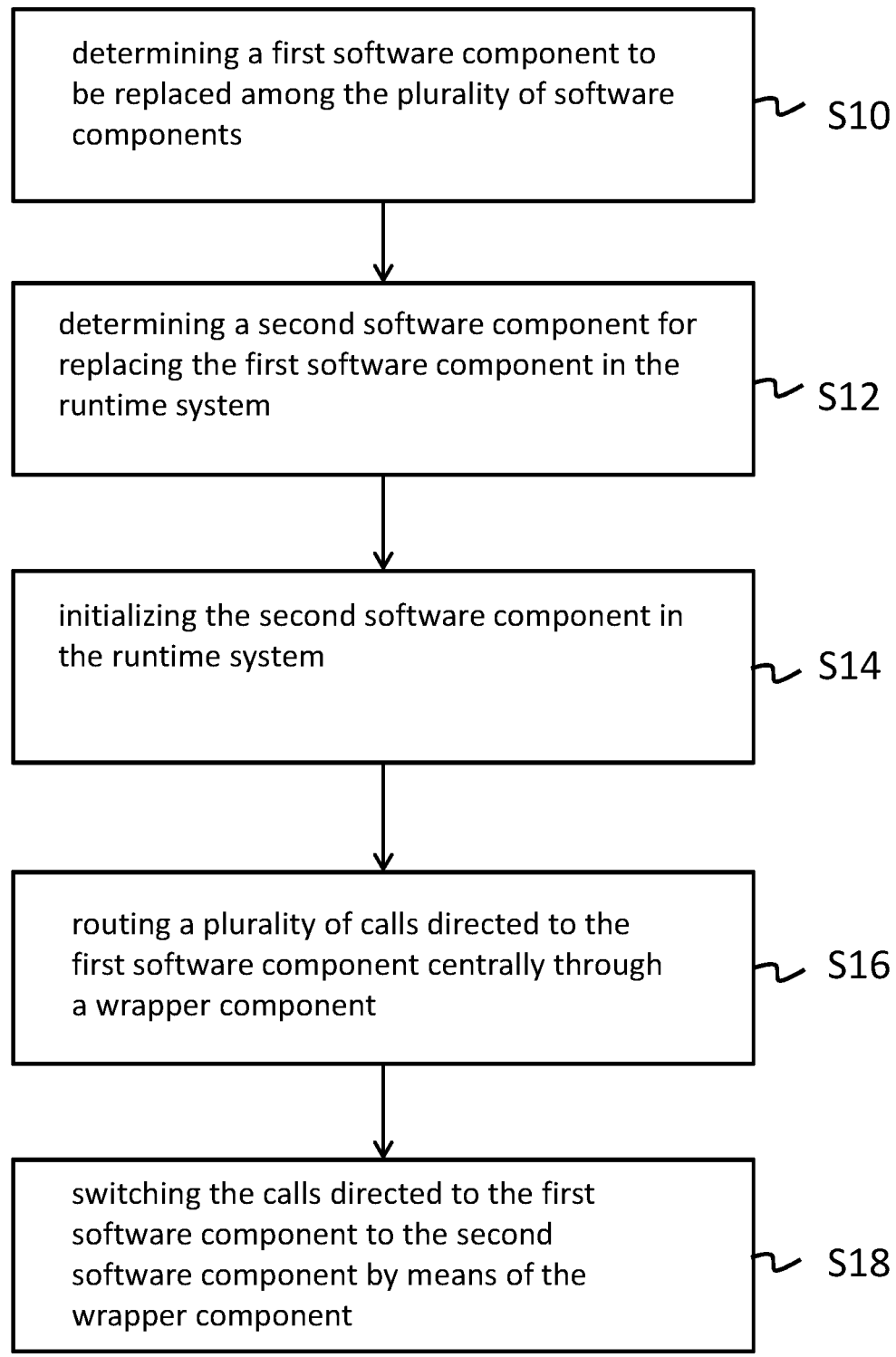
FIG. 4 is a flow diagram illustrating a method for replacing a software component according to an embodiment.

FIG. 4 is a flow diagram that illustrates an embodiment of a method for replacing a software component among a plurality of software components of a component-based runtime system.

In a first step S10, a first software component to be replaced among a plurality of software components is determined or identified.

In a step S12, a second software component for replacing the first software component in the runtime system is determined or identified.

In a third step S14, the second software component is initialized in the runtime system.

In a fourth step S16, a plurality of calls directed to the first software component are routed centrally through a wrapper component.

In a fifth step S18, the calls directed to the first software component are switched to the second software component by means of the wrapper component.

The flow diagram of FIG. 4 shows the steps S10 to S18 in a given order. However, the disclosure is not limited to this particular order, and in other embodiments the steps S10 to S18 may be implemented in a different order.

In some examples, the wrapper component only switches the calls directed to the first software component to the second software component once the initialization of the second software component in the runtime system is complete. This minimizes the time required for switching from the first software component to the second software component, and hence reduces or minimizes an interference of the replacement operation with the industrial control process.

The examples and the Figures merely serve to illustrate the invention but should not be understood to imply any limitation. The scope of the invention is to be determined from the appended claims.

A Method and System for Replacing a Software Component of a Runtime System

REFERENCE SIGNS 10 industrial control environment
12 industrial controller unit
12 programming environment
14 first network
18a, 18b, 18c industrial control process/machinery
20 second network
22 external database
24 third network
26 control application
28 runtime system
30a-30e software components of runtime system 28
32 component manager unit of runtime system 28
34 wrapper component of runtime system 28
36 replacement component
38 data pertaining to software component 30e
40 initialization unit
42 data pertaining to replacement component 36

What is claimed is:

1. A method for replacing a software component among a plurality of software components of a runtime system of an industrial control environment, the method comprising:
   determining, by an industrial controller, a first software component to be replaced among the plurality of software components;
   determining, by the industrial controller, a second software component for replacing the first software component in the runtime system;
   initializing, by the industrial controller, the second software component in the runtime system, wherein initializing the second software component further comprises setting a plurality of inactive function pointers to the second software component via a wrapper component, each of the plurality of inactive function pointers being associated with a corresponding active function pointer to the first software component;
   routing, by the industrial controller, a plurality of calls directed to the first software component centrally through the wrapper component, wherein routing the plurality of calls directed to the first software component through the wrapper component further comprises continuing to route the plurality of calls directed to the first software component to the first software component until setting the plurality of inactive function pointers to active function pointers; and
   switching, by the industrial controller, the plurality of calls directed to the first software component to the second software component via the wrapper component, wherein switching the plurality of calls directed to the first software component to the second software component further comprises setting the plurality of inactive function pointers to active function pointers to reroute the plurality of calls directed to the first software component to the second software component without interrupting an operation of the runtime system of the industrial control environment.

2. The method according to claim 1, further comprising detecting a presence of active calls directed to the first software component, and switching the plurality of calls directed to the first software component to the second software component only if no active calls are detected.

3. The method according to claim 1, further comprising blocking the plurality of calls directed to the first software component prior to switching the plurality of calls directed to the first software component to the second software component.

4. The method according to claim 1, further comprising loading the second software component into the runtime system.

5. The method according to claim 1, wherein initializing the second software component comprises setting at least one function pointer to other components, and/or handing over at least one data pointer to active data pertaining to the first software component.

6. The method according to claim 1, wherein initializing the second software component comprises allocating or initializing additional data pertaining to the second software component.

7. A system for replacing a software component among a plurality of software components of a runtime system of an industrial control environment, the system comprising:
   an industrial controller having a processing unit for running a compiled industrial control program, the processing unit to cause loading of a wrapper component into a runtime system of the industrial controller and configured to:
   determine a first software component among the plurality of software components, wherein the first software component is to be replaced;
   determine a second software component for replacing the first software component in the runtime system;
   initialize the second software component in the runtime system based on setting a plurality of inactive function pointers to the second software component via the wrapper component, each of the plurality of inactive function pointers being associated with a corresponding active function pointer to the first software component;
   route a plurality of calls directed to the first software component centrally through the wrapper component, wherein routing the plurality of calls directed to the first software component through the wrapper component further comprises continuing to route the plurality of calls directed to the first software component to the first software component until setting the plurality of inactive function pointers to active function pointers; and
   wherein the wrapper component is adapted to switch the plurality of calls directed to the first software component to the second software component based on setting the plurality of inactive function pointers to active function pointers to reroute the plurality of calls directed to the first software component to the second software component without interrupting an operation of the runtime system of the industrial control environment.

8. The system according to claim 7, wherein the industrial controller is further configured to switch the calls directed to the first software component to the second software component in response to detecting no active calls directed to the first software component.

9. The system according to claim 7, wherein the industrial controller is configured to block an active call to the first software component prior to switching the plurality of calls directed to the first software component to the second software component.

10. The system according to claim 7, wherein the industrial controller is configured to re-route the plurality of calls directed to the first software component centrally through the wrapper component and to the second software component based on setting the plurality of inactive function pointers to active function pointers, and setting each corresponding active function pointer associated with the first software component to inactive function pointers.

11. The system according to claim 7, wherein the industrial controller is configured to unload the first software component after setting the plurality of inactive function pointers to active function pointers.

* * * * *